(12) United States Patent  
Casasso et al.

(10) Patent No.: US 8,265,894 B2  
(45) Date of Patent: Sep. 11, 2012

(54) METHOD FOR ESTIMATING THE TEMPERATURE IN AN INTERNAL COMBUSTION ENGINE

(75) Inventors: Paolo Casasso, Cuneo (IT); Massimo Lucano, Alessandria (IT); Filippo Parisi, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 454 days.

(21) Appl. No.: 12/492,330

(22) Filed: Jun. 26, 2009  
(Under 37 CFR 1.47)

(65) Prior Publication Data  
US 2010/0082285 A1 Apr. 1, 2010

(30) Foreign Application Priority Data  
Jun. 27, 2008 (GB) .................................. 0811771.5

(51) Int. Cl.  
*G01K 7/16* (2006.01)

(52) U.S. Cl. ........................................................ 702/133

(58) Field of Classification Search .................... 702/133  
See application file for complete search history.

(56) References Cited

U.S. PATENT DOCUMENTS

| | | | |
|---|---|---|---|
| 5,959,538 A | 9/1999 | Schousek | |
| 6,028,472 A | 2/2000 | Nagumo | |
| 2002/0190734 A1 | 12/2002 | Burt et al. | |

FOREIGN PATENT DOCUMENTS

| | | | |
|---|---|---|---|
| JP | 2001304979 A | 10/2001 | |
| JP | 2007-318028 | * 12/2007 | |
| JP | 2007318028 A | 12/2007 | |
| KR | 20030002276 A | 1/2003 | |
| WO | 9919690 A1 | 4/1999 | |
| WO | 2006057054 A1 | 6/2006 | |

OTHER PUBLICATIONS

Bonnie C. Baker, (Precision Temperature-Sensing With RTD Circuits, 2003 Microchip Technology Inc., p. 1-5.*  
UK Intellectual Property Office, British Examination Report for Application No. 0811771.5, dated Nov. 28, 2011.  
British Patent Office, British Search Report for Application No. 0811771.5, dated Oct. 1, 2008.

* cited by examiner

*Primary Examiner* — Tung S Lau  
(74) *Attorney, Agent, or Firm* — Ingrassia Fisher & Lorenz, P.C.

(57) ABSTRACT

A method is provided for estimating the temperature in an internal combustion engine. The method includes, but is not limited to the steps of providing a sensor resistor (RTD) in the internal combustion engine, the sensor resistor (RTD) having a predetermined resistance-temperature characteristic, measuring a sensor voltage ($V_{RTD}$) across the sensor resistor (RTD), calculating a resistance value of the sensor resistor (RTD) based on the sensor voltage ($V_{RTD}$) and estimating the temperature using the resistance value and the resistance-temperature characteristic. The method further comprises the steps of connecting, in series to the sensor resistor (RTD), a first branch of a current mirror arrangement, connecting a reference resistor ($R_0$) in series to a second branch of the current mirror arrangement, measuring a reference voltage ($V_0$) across the reference resistor ($R_0$) and calculating the resistance value of the sensor resistor (RTD) based on the sensor voltage ($V_{RTD}$) and the reference voltage ($V_0$).

7 Claims, 2 Drawing Sheets

METHOD FOR ESTIMATING THE TEMPERATURE IN AN INTERNAL COMBUSTION ENGINE

CROSS-REFERENCE TO RELATED APPLICATION

This application claims priority to British Patent Application No. 0811771.5, filed Jun. 27, 2008, which is incorporated herein by reference in its entirety.

TECHNICAL FIELD

The present invention relates to temperature estimation and more particularly to the estimation of the temperature in an internal combustion engine.

BACKGROUND

Linear resistive temperature sensors ("RTD") are today utilized in automotive control to monitor the high temperature in the exhaust pipes and in the catalyst of combustion engines.

The temperature to be monitored covers a wide range, from about −40° C. to about 1000° C., and the corresponding sensor resistance variation is from about 170Ω to about 850Ω, with quasi-linear temperature dependency. The resolution of the temperature measurement is therefore limited and measurement errors have a greater impact.

A conventional conditioning circuit for RTD sensors used in automotive controllers is shown in FIG. 1. This circuit consists of a very accurate pull-up resistor $R_1$, particularly having a value of 1 kΩ, connected to an accurate supply voltage source Vcc, for example having a value of 5V. A sensor resistor RTD, which is a linear resistive temperature sensor, is connected in series between the pull-up resistor $R_1$ and a voltage reference, particularly a ground conductor. A low pass filter 2 comprising a resistor $R_f$ and a capacitor $C_f$ is connected in parallel to the sensor resistor RTD, and is used to reduce the noise from the electrical environment. An analogue to digital converter ADC is connected in parallel to the filter 2 and is also connected to a reference voltage source $V_{ADC}$ that tracks the supply voltage source Vcc. A microprocessor M is connected between the converter ADC and an output OUT of the circuit.

A voltage $V_{meas}$ across the sensor resistor RTD is measured at a node A with respect to ground, and applies:

$$V_{meas} = \frac{RTD}{R_1 + RTD} \quad (1)$$

The resistance value of the sensor resistor RTD is obtained. Specifically, the voltage $V_{meas}$ across the sensor resistor RTD is measured in a known manner and it is supplied to the converter ADC, which provides a digital value corresponding to said voltage. The digital value is supplied to the microprocessor M which calculates, according to equation 1, the resistance value of the sensor resistor RTD. Knowing the dependency between the resistance value of the sensor resistor RTD and the temperature, it is possible to obtain, at the output OUT of the circuit, the estimated value of the temperature.

The overall accuracy of the temperature measurement is mainly affected by: sensor resistance accuracy; conditioning circuit tolerances; quantization steps of the converter ADC; conversion errors of the converter ADC; leakage current of the converter ADC through the low pass filter 2.

The drawbacks of such architecture is that: it utilizes less than half span of the available converter input voltage range; the transfer function is non linear due to the voltage divider arrangement between the pull-up resistor $R_1$ and the sensor resistor RTD; the sensitivity $\Delta V_{meas}/\Delta$Temperature is very low, for example not higher than about 1.2 mV/° C. at about @ 600° C.; the sensitivity $\Delta V_{meas}/\Delta$Temperature is not constant and decreases with the increase of the temperature; a very accurate and expensive pull-up resistor, particularly with 0.1% of tolerance, is required.

In view of the above, it is at least one object of the present invention to provide an alternative method for estimating the temperature in an internal combustion engine so as to improve the overall accuracy and sensitivity without the need to use complex circuits with expensive electronic components. In addition, other objects, desirable features, and characteristics will become apparent from the subsequent summary and detailed description, and the appended claims, taken in conjunction with the accompanying drawings and this background.

The at least one object, and other objects, desirable features, and characteristics, are achieved according to the present invention by the method. The method for estimating the temperature in an internal combustion engine comprising the steps of: providing a sensor resistor (RTD) in the internal combustion engine, the sensor resistor (RTD) having a predetermined resistance-temperature characteristic, measuring a sensor voltage ($V_{RTD}$) across the sensor resistor (RTD), determining a resistance value of said sensor resistor (RTD) based on the sensor voltage ($V_{RTD}$), and estimating the temperature based on said resistance value and the resistance-temperature characteristic. The method further comprises the steps of connecting, in series to the sensor resistor (RTD), a first branch of a current mirror arrangement, connecting a reference resistor ($R_0$) in series to a second branch of the current mirror arrangement, measuring a reference voltage ($V_0$) across the reference resistor ($R_0$), and calculating the resistance value of the sensor resistor (RTD) based on the sensor voltage ($V_{RTD}$) and the reference voltage ($V_0$).

The at least one object, and other objects, desirable features, and characteristics, are achieved according to the present invention by a circuit. The circuit for estimating the temperature in an internal combustion engine comprises a sensor resistor (RTD) having a predetermined resistance-temperature characteristic, computing means (M) connected in parallel to the sensor resistor (RTD) and arranged to measure a sensor voltage ($V_{RTD}$) across said sensor resistor (RTD), calculate a resistance value of the sensor resistor (RTD) based on the sensor voltage ($V_{RTD}$), and estimate a temperature value using the resistance value and the resistance-temperature characteristic of the sensor resistor (RTD). The circuit being wherein it further comprises a first branch of a current mirror arrangement connected in series to the sensor resistor (RTD), and a reference resistor ($R_0$) connected in series to a second branch of the current mirror arrangement.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
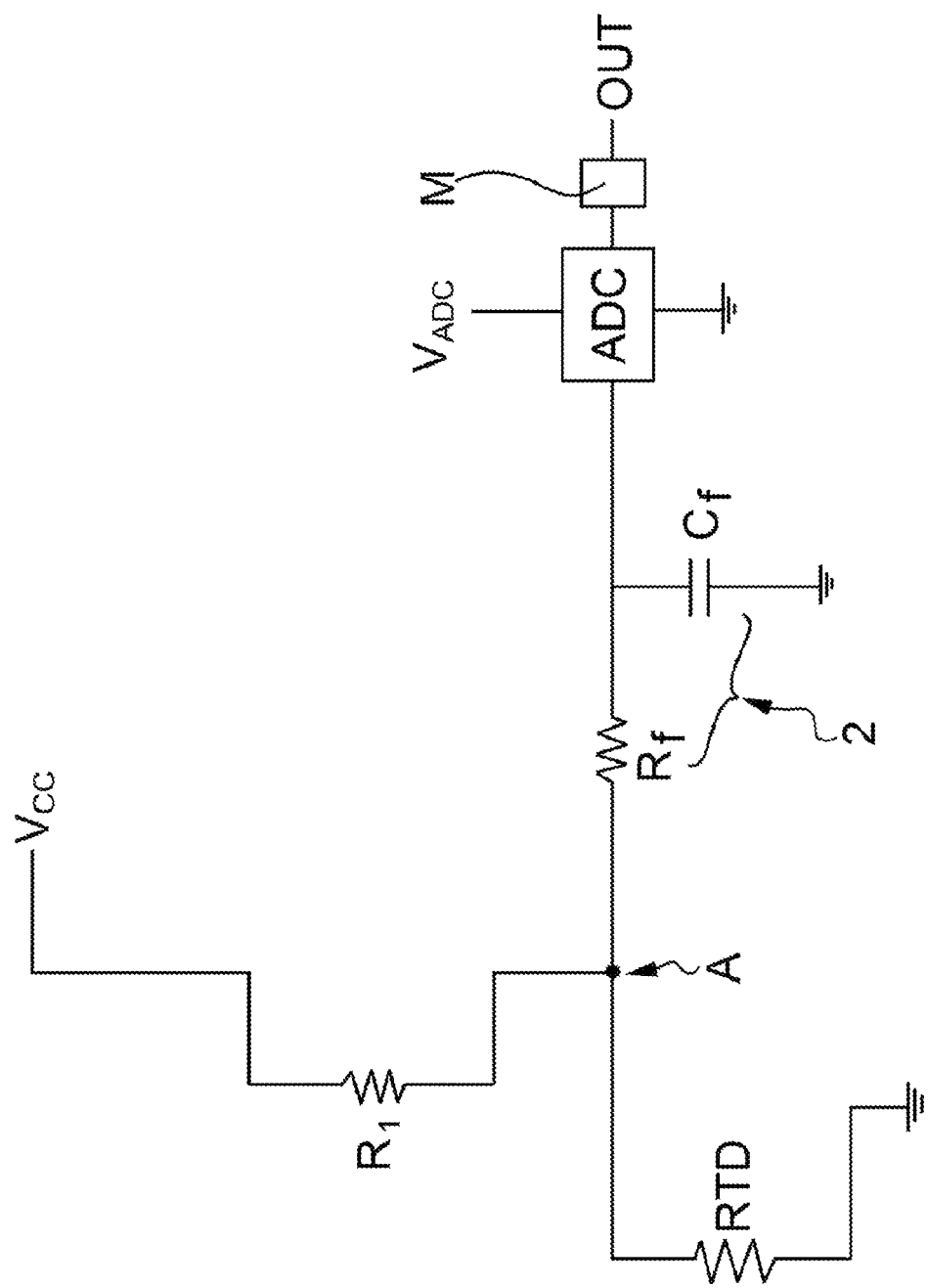
FIG. 1 is a schematic representation of a conditioning circuit for a temperature sensor of the prior art.
Figure 2:
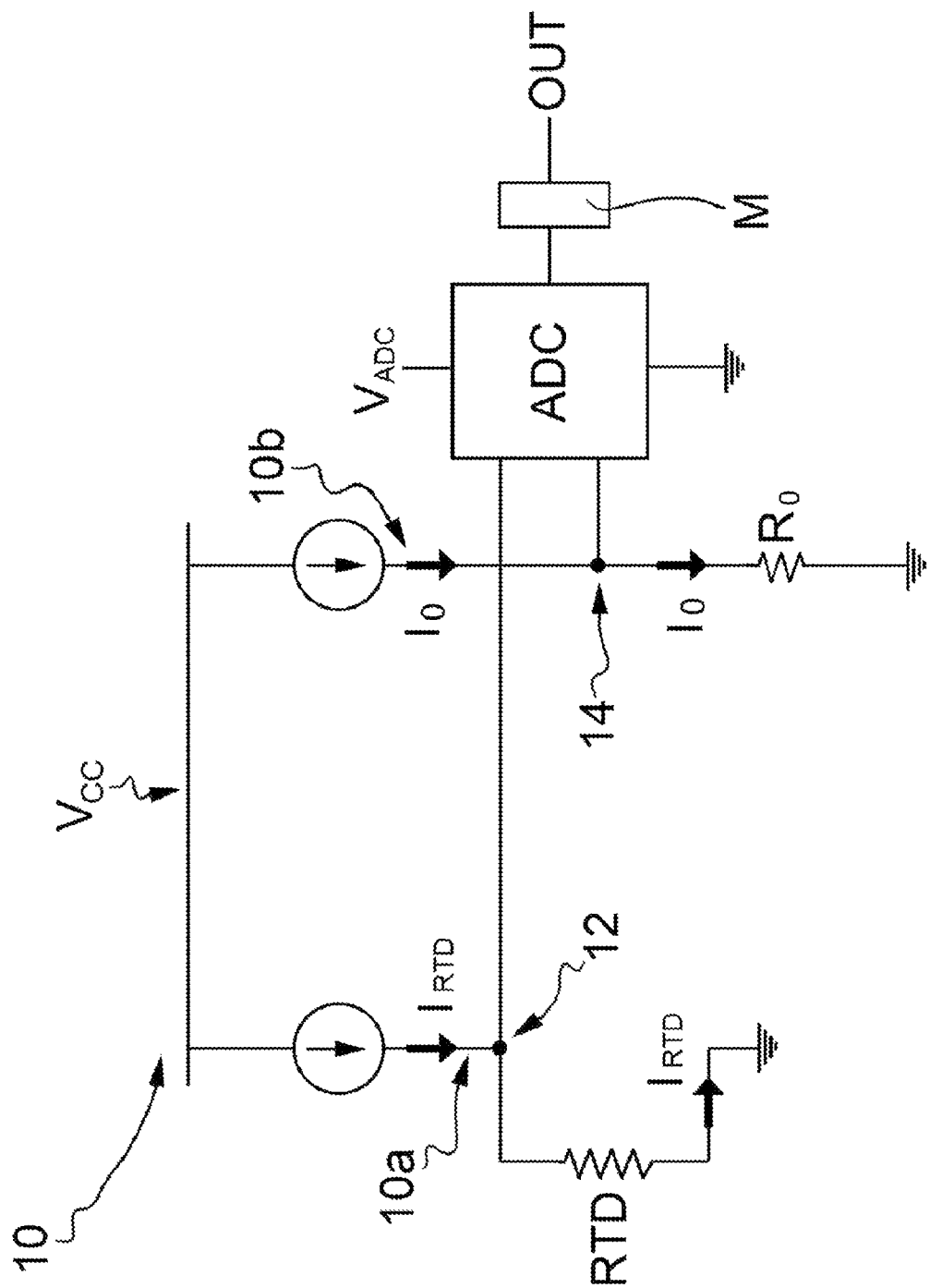
FIG. 2 is a schematic representation of a conditioning circuit for a temperature sensor according to an embodiment of the invention.

FIG. 2 shows a conditioning circuit according to the invention; similar elements to those of FIG. 1 above disclosed have same references.

A sensor resistor RTD, which is a linear resistive temperature sensor (i.e., a resistor having a linear resistance-temperature characteristic), is connected to a voltage reference, particularly a ground conductor, and it is also connected in series to a first branch 10a of a current mirror arrangement 10. The current mirror arrangement 10 is connected to a supply voltage source Vcc, having for example a value of 5V. A reference resistor $R_0$ is connected in series to a second branch 10b of the current mirror 10.

A first node 12 of the first branch 10a and a second node 14 of the second branch 10b are connected to an analogue to digital converter ADC, which is also connected to a reference voltage source $V_{ADC}$. The first node 12 is used to measure a sensor voltage $V_{RTD}$ across the sensor resistor RTD; the second node 14 is used to measure a reference voltage $V_0$ across the reference resistor $R_0$. A microprocessor M is connected between the converter ADC and an output OUT of the circuit.

The conditioning circuit disclosed is such that a reference current $I_0$ and a mirrored current $I_{RTD}$ are supplied by the current mirror 10 to the reference resistor $R_0$ and to the sensor resistor RTD, respectively. The current mirror 10 ensures that the reference current $I_0$ is equal to the mirrored current $I_{RTD}$. For this reason, coherent measurements of the sensor voltage $V_{RTD}$ across the sensor resistor RTD and the reference voltage $V_0$ across the reference resistor $R_0$ are used to obtain the value of the sensor resistor RTD, as disclosed herein below.

The current mirror 10 provides that:

$$I_0 = I_{RTD}$$

The above identity can be rewritten as:

$$\frac{V_0}{R_0} = \frac{V_{RTD}}{RTD} \quad (3)$$

and therefore:

$$RTD = R_0 \frac{V_{RTD}}{V_0} \quad (4)$$

Coherent measurements of the reference voltage $V_0$ and the sensor voltage $V_{RTD}$ are two measurement of two voltage signals made in a known manner in a short time frame, and it is therefore possible to consider constant and equal the reference current $I_0$ and the mirrored current $I_{RTD}$.

The reference voltage $V_0$ and sensor voltage $V_{RTD}$ are supplied to the converter ADC which provides digital values corresponding to the voltages, respectively. The digital values are supplied to the microprocessor M which calculates, according to equation 3 and equation 4, the resistance value of the sensor resistor RTD. Knowing the dependency between the resistance value of the sensor resistor RTD and the temperature it is possible to obtain, at the output OUT of the circuit, an estimation of the value of the temperature.

The above disclosed method ensures that the measure is not dependent on the reference voltage source $V_{ADC}$ of the converter ADC, is not dependent on the supply voltage source $V_{CC}$ and is not dependent on the temperature.

The current mirror 10 is preferably realized with a matched pair of transistors connected each other in a known manner. Alternatively, more complex current mirrors per se known can be used.

Preferably, typical low pass filters each comprising a resistor $R_f$ and a capacitor $C_f$ are connected in parallel to the sensor resistor RTD so as to reduce the noise from the electrical environment. Advantageously, low pass filters each comprising a resistor and a capacitor are connected in parallel to the reference resistor $R_0$. The converter ADC is connected in parallel to the filters, between the filters and the microprocessor M.

The reference current $I_0$ must be designed so as to maximize the voltage span in the available converter input voltage range and to minimize self-heating of the sensor resistor RTD.

The embodiments of the invention can be generalized for n-sensors conditioning circuit having in this case a common reference current $I_0$ mirrored in n-lines, one for each sensor. The circuit has n-selection switches, one for each sensor, used for diagnostic recovery in case of electrical fault on the "RTD" sensors. The embodiments of the invention are also applicable in both diesel and gasoline engines.

Clearly, the principle of the invention remaining the same, the embodiments and the details of production can be varied considerably from what has been described and illustrated purely by way of non-limiting example, without departing from the scope of protection of the present invention as defined by the attached claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A circuit for estimating a temperature in an internal combustion engine, the circuit comprising:
   a sensor resistor (RTD) having a predetermined resistance-temperature characteristic;
   a computer (M) connected in parallel to the sensor resistor (RTD) and arranged to:
   measure a sensor voltage ($V_{RTD}$) across said sensor resistor (RTD);
   calculate a resistance value of said sensor resistor (RTD) based on said sensor voltage ($V_{RTD}$); and
   estimate a temperature value using said resistance value and the predetermined resistance-temperature characteristic of the sensor resistor (RTD);
   a first branch of a current mirror arrangement connected in series to said sensor resistor (RTD);
   a reference resistor ($R_0$) connected in series to a second branch of the current mirror arrangement,
   wherein the computer (M) is connected in parallel to the reference resistor ($R_0$) and being arranged to:

measure a reference voltage ($V_0$) across said reference resistor ($R_0$); and calculate the resistance value of said sensor resistor (RTD) based on said sensor voltage ($V_{RTD}$) and said reference voltage ($V_0$); and an analogue to digital converter (ADC) in parallel to the sensor resistor (RTD) and the reference resistor ($R_0$) configured to provide digital values representative of the sensor voltage ($V_{RTD}$) and the reference voltage ($V_0$).

2. The circuit of claim 1, wherein the current mirror arrangement is configured to supply a mirrored current ($I_{RTD}$) to the sensor resistor (RTD), said mirrored current ($I_{RTD}$) flowing through the first branch of the current mirror arrangement.

3. The circuit of claim 1, wherein the current mirror arrangement is configured to supply a reference current ($I_0$) to the reference resistor ($R_0$), said reference current ($I_0$) flowing through said second branch of the current mirror arrangement.

4. The circuit of claim 2, wherein the current mirror arrangement is configured to supply a reference current ($I_0$) to the reference resistor ($R_0$), said reference current ($I_0$) flowing through said second branch of the current mirror arrangement.

5. The circuit of claim 4, wherein the computer (M) is configured to calculate the resistance value of the sensor resistor (RTD) according to:

$$RTD = R_0 \frac{V_{RTD}}{V_0}$$

where RTD is a value representative of the resistance value of the sensor resistor (RTD).

6. A circuit for estimating a temperature in an internal combustion engine, the circuit comprising:

a sensor resistor (RTD) having a predetermined resistance-temperature characteristic;

a computer (M) connected in parallel to the sensor resistor (RTD) and arranged to:

measure a sensor voltage ($V_{RTD}$) across said sensor resistor (RTD);

calculate a resistance value of said sensor resistor (RTD) based on said sensor voltage ($V_{RTD}$); and estimate a temperature value using said resistance value and the predetermined resistance-temperature characteristic of the sensor resistor (RTD);

a first branch of a current mirror arrangement connected in series to said sensor resistor (RTD); and a reference resistor ($R_0$) connected in series to a second branch of the current mirror arrangement, wherein the computer (M) is connected in parallel to the reference resistor ($R_0$) and being arranged to:

measure a reference voltage ($V_0$) across said reference resistor ($R_0$); and calculate the resistance value of said sensor resistor (RTD) based on said sensor voltage ($V_{RTD}$) and said reference voltage ($V_0$), wherein the computer (M) is configured to calculate the resistance value of the sensor resistor (RTD) according to:

$$RTD = R_0 \frac{V_{RTD}}{V_0}$$

where RTD is a value representative of the resistance value of the sensor resistor (RTD).

7. The circuit of claim 6, further comprising an analogue to digital converter (ADC) in parallel to the sensor resistor (RTD) and the reference resistor ($R_0$) configured to provide digital values representative of the sensor voltage ($V_{RTD}$) and the reference voltage ($V_0$).

* * * * *